(12) United States Patent
You et al.

(10) Patent No.: US 12,134,718 B2
(45) Date of Patent: Nov. 5, 2024

(54) POTTING ADHESIVE AND HEAT DISSIPATION DEVICE

(71) Applicant: DELTA ELECTRONICS (SHANGHAI) CO., LTD., Shanghai (CN)

(72) Inventors: Peiai You, Shanghai (CN); Hao Sun, Shanghai (CN); Zhen Zhou, Shanghai (CN); Minli Jia, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 674 days.

(21) Appl. No.: 17/331,851

(22) Filed: May 27, 2021

(65) Prior Publication Data

US 2021/0395583 A1   Dec. 23, 2021

(30) Foreign Application Priority Data

Jun. 19, 2020   (CN) .......................... 202010565591.2

(51) Int. Cl.
| | | |
|---|---|---|
| *C09J 183/05* | (2006.01) | |
| *B32B 27/20* | (2006.01) | |
| *C09J 11/04* | (2006.01) | |
| *C09J 11/08* | (2006.01) | |
| *C09J 183/04* | (2006.01) | |
| *C09K 5/14* | (2006.01) | |
| *H01F 27/22* | (2006.01) | |
| *H01F 27/32* | (2006.01) | |

(52) U.S. Cl.
CPC ............ *C09J 183/04* (2013.01); *C09J 11/04* (2013.01); *C09J 11/08* (2013.01); *C09K 5/14* (2013.01); *H01F 27/22* (2013.01); *H01F 27/327* (2013.01)

(58) Field of Classification Search
None
See application file for complete search history.

(56) References Cited

U.S. PATENT DOCUMENTS

| | | | | |
|---|---|---|---|---|
| 4,374,222 | A   * | 2/1983 | Meyer ................ | C08G 18/3825 524/241 |
| 6,448,329 | B1 * | 9/2002 | Hirschi .................. | C08L 83/04 524/588 |
| 2022/0169799 | A1* | 6/2022 | Ota ..................... | H01M 10/613 |

FOREIGN PATENT DOCUMENTS

| | | | | |
|---|---|---|---|---|
| CN | 102337033 | A | 2/2012 | |
| CN | 103102689 | A | 5/2013 | |
| CN | 105176484 | A | 12/2015 | |
| CN | 107871591 | A | 4/2018 | |
| CN | 109546855 | A   * | 3/2019 | ............ H02J 7/0042 |
| CN | 109897591 | A | 6/2019 | |
| CN | 109979737 | A | 7/2019 | |

OTHER PUBLICATIONS

Machine translation of CN-109546855-A (no date).*
CN Office Action for Application No. 202010565591.2, mailed Nov. 18, 2021.
CN Search Report for Application No. 202010565591.2, mailed Nov. 18, 2021.
Theoretical basis and application of polymer material processing machinery design, First Edition, Zhai, Ganbo etc., p. 13, East China Normal University Press.
Chinese Office Action for Application No. 202010565591.2, mailed Apr. 24, 2022.

* cited by examiner

*Primary Examiner* — Michael J Feely
(74) *Attorney, Agent, or Firm* — NIXON PEABODY LLP

(57) ABSTRACT

The present disclosure relates to a potting adhesive, including: a component A and a component B, the component A including a first liquid organic adhesive containing dimethyl siloxane, the component B including a second liquid organic adhesive containing methyl hydrogen siloxane and silicone oil, at least one of the component A and the component B further including ceramic particles which are spherical particles with a particle size of 0.1 mm to 3 mm. The present disclosure further relates to a heat dissipation device, including an adhesive potting groove, a transformer provided in the adhesive potting groove, and a filling medium which fills and is consolidated in a gap between the transformer and the adhesive potting groove.

18 Claims, 1 Drawing Sheet

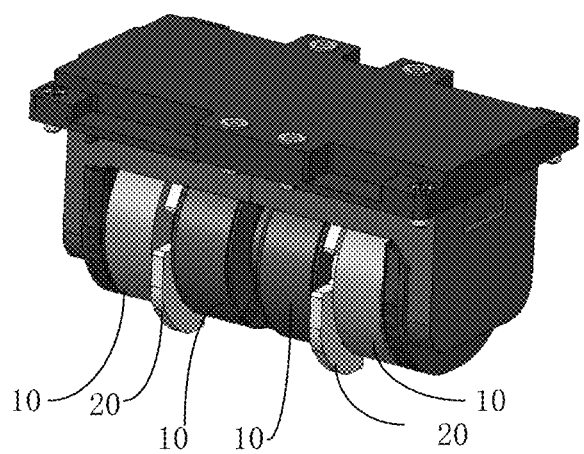

POTTING ADHESIVE AND HEAT DISSIPATION DEVICE

CROSS REFERENCE TO RELATED APPLICATION

The present application claims priority to Chinese Patent Application with No. 202010565591.2, entitled "Potting Adhesive and Heat dissipation Device", and filed on Jun. 19, 2020, the content of which is expressly incorporated herein by reference in its entirety.

TECHNICAL FIELD

The present disclosure relates to the field of potting adhesive, and particularly to a potting adhesive and a heat dissipation device.

BACKGROUND

With the continuous increase in the endurance capability of electric vehicles, the power of on-board chargers is also increased. The conventional 6.6 kw can no longer meet the needs of customers. Under the condition of three-phase input, 11 kw and 22 kw will be the mainstream of the on-board chargers in the future, but the increase in power requires a corresponding increase in volume of the charger, resulting in a compression of other spaces in the car, which is not in line with the development trend of modern automobiles. If the power of the on-board charger is increased without increasing the volume, that is, the power density is increased, it is necessary to design more integrated electronic components. Such components have greater power loss per unit volume and release more heat, and the conventional heat dissipation devices cannot meet the demand. Therefore, a heat dissipation device with better heat dissipation effect is urgently needed to meet the requirements of structural design and system thermal management design.

SUMMARY

In view of this, it is necessary to provide a potting adhesive and a heat dissipation device in order to meet the heat dissipation requirement of the high power on-board charger.

The present disclosure provides a potting adhesive, including: a component A and a component B, wherein the component A includes a first liquid organic adhesive containing dimethyl siloxane, the component B includes a second liquid organic adhesive containing methyl hydrogen siloxane and silicone oil, at least one of the component A and the component B further includes ceramic particles which are spherical particles with a particle size of 0.1 mm to 3 mm.

The present disclosure further provides a heat dissipation device, including an adhesive potting groove, a transformer provided in the adhesive potting groove, and a filling medium which fills and is consolidated in a gap between the transformer and the adhesive potting groove, wherein the filling medium is the potting adhesive.

Compared with the conventional two-component potting adhesive, the potting adhesive provided by the present disclosure has a greatly improved thermal conductivity, a better heat dissipation effect, stable components which are not easy to settle, and has good potting and heat dissipation effect especially for the transformer of the on-board charger.

BRIEF DESCRIPTION OF THE DRAWINGS

FIG. 1 is a schematic structure diagram of a transformer according to an embodiment of the present disclosure.

DETAILED DESCRIPTION

In order to facilitate the understanding of the present disclosure, the present disclosure will be described more comprehensively below. The present disclosure can be implemented in many different forms and is not limited to the embodiments described herein. Rather, these embodiments are provided to make the understanding of the present disclosure more thorough and comprehensive.

Unless otherwise defined, all technical and scientific terms used herein have the same meaning as commonly understood by those skilled in the technical field of the present disclosure. The terms used in the description of the present disclosure herein are only for the purpose of describing specific embodiments, and are not intended to limit the present disclosure. The term "and/or" as used herein includes any and all combinations of one or more related listed items.

Unless otherwise indicated, all numbers representing characteristic dimensions, quantities, and physical and chemical properties used in this specification and claims should be understood as being modified by the term "about" in all cases. Therefore, unless otherwise stated, the numerical parameters listed in the above specification and appended claims are approximate values, and those skilled in the art can use the teachings disclosed herein to find the required characteristics and change these approximate values appropriately. The use of numerical ranges expressed by endpoints includes all numbers and any range within that range, for example, a range of 1 to 5 includes 1, 1.1, 1.3, 1.5, 2, 2.75, 3, 3.80, 4 and 5 and so on.

The "particle size" in the present disclosure refers to a median particle size $D_{50}$, that is, a particle size corresponding to the 50% cumulative distribution of particles.

In an embodiment of the present disclosure, a potting adhesive is provided, which includes a component A and a component B. The component A includes a first liquid organic adhesive containing dimethyl siloxane; and the component B includes a second liquid organic adhesive containing methyl hydrogen siloxane and silicone oil. At least one of the component A and the component B further includes ceramic particles, and the ceramic particles are spherical particles with a particle size of 0.1 mm to 3 mm.

The potting adhesive provided by the embodiment of the present disclosure is formed by dimethyl siloxane, methyl hydrogen siloxane, silicone oil and ceramic particles cooperated with each other. Compared with the conventional two-component potting adhesive, the thermal conductivity is greatly improved, the heat dissipation effect is better, and the composition is stable and not easy to settle, and has a good potting and heat dissipation effect especially for the transformer of the on-board charger.

The component A and the component B can be liquid under normal conditions and exhibit indefinite storage stability when separated from each other, but after the two components have been fully mixed, or at least are in contact with each other and activated, the two components cure quickly.

The first liquid organic adhesive is a first reactive component and at least includes dimethyl siloxane. A mass proportion of the dimethyl siloxane in the first liquid organic adhesive is in a range of 55% to 70%.

The first liquid organic adhesive may further include a first inorganic filler, and the particle size of the first inorganic filler is in the order of micrometers, preferably in a range of 5 μm to 30 μm, more preferably in a range of 20 μm to 25 μm. The first inorganic filler may include suitable inorganic oxides or hydroxides or mixtures thereof, especially oxides or hydroxides of silicon, aluminum, magnesium, titanium, and calcium. The mass proportion of the first inorganic filler in the first liquid organic adhesive is in a range of 35% to 50%.

The second liquid organic adhesive is a second reactive component and at least includes methyl hydrogen siloxane and silicone oil. The mass proportion of the methyl hydrogen siloxane in the second liquid organic adhesive is in a range of 30% to 45%, and the mass proportion of the silicone oil in the second liquid organic adhesive is in a range of 25% to 30%.

The second liquid organic adhesive may further include a second inorganic filler, and the particle size of the second inorganic filler is in the order of micrometers, preferably in a range of 5 μm to 30 μm, more preferably in a range of 20 μm to 25 μm. The second inorganic filler may include suitable inorganic oxides or hydroxides or mixtures thereof, especially oxides or hydroxides of silicon, aluminum, magnesium, titanium, and calcium. The mass proportion of the second inorganic filler in the second liquid organic adhesive is in a range of 30% to 50%.

The particle size of the ceramic particles may be in a range of 0.1 mm to 3 mm, preferably in a range of 0.5 mm to 2 mm, and more preferably in a range of 0.5 mm to 1 mm.

At least one of the component A and the component B includes the ceramic particles. The ceramic particles may be the ceramic particles dispersed in the first liquid organic adhesive, or may be the ceramic particles dispersed in the second liquid organic adhesive, or may be the ceramic particles dispersed in the first liquid organic adhesive and the ceramic particles dispersed in the second liquid organic adhesive. Preferably, the ceramic particles are uniformly dispersed in the component A and/or the component B.

The composition of the ceramic particles may be one or more of aluminum oxide, aluminum nitride, boron nitride, and silicon carbide, and is preferably aluminum oxide.

A mass ratio of the first liquid organic adhesive to the second liquid organic adhesive to the ceramic particles in the component A and/or the component B can be equal to 1:1:(0.1 to 2) which further includes but is not limited to 1:1:0.2, 1:1:0.3, 1:1:0.4, 1:1:0.5, 1:1:0.6, 1:1:0.7, 1:1:0.8, 1:1:0.9, 1:1:1.0, 1:1:1.1, 1:1:1.2, 1:1:1.3, 1:1:1.4, 1:1:1.5, 1:1:1.6, 1:1:1.7, 1:1:1.8, 1:1:1.9. Preferably, the mass ratio of the first liquid organic adhesive to the second liquid organic adhesive to the ceramic particles is equal to 1:1:(1.5 to 2).

In an embodiment, both the component A and the component B include the ceramic particles. The mass of the ceramic particles included in the component A can be equal or not equal to the mass of the ceramic particles included in the component B.

In an embodiment, a mass ratio of the ceramic particles in the component A to the ceramic particles in the component B is equal to (0.5 to 2):1, which may further include but is not limited to 0.6:1, 0.7:1, 0.8:1, 0.9:1, 1.0:1, 1.1:1, 1.2:1, 1.3:1, 1.4:1, 1.5:1, 1.6:1, 1.7:1, 1.8:1, 1.9:1.

The component A and/or the component B may further include one or more other components, for example, a defoaming agent, a reactive diluent, a reactive initiator, a toughening agent, a coupling agent, a wetting and dispersing agent, an accelerant, a stabilizer, a water absorbing agent, a curing accelerant, an antioxidant, an adhesion promoter, and a solvent. The other components exist in the component A and/or the component B compatible therewith. Thus, for example, the defoaming agent when exists is included in the component A and/or the component B; the reactive diluent when exists is included in the component A and/or the component B; the reactive initiator when exists is included in the component A and/or the component B; the toughening agent when exists is included in the component A and/or the component B; the coupling agent when exists is included in the component A and/or the component B; the wetting and dispersing agent when exists is included in the component A and/or the component B; the accelerant when exists is included in the component A and/or the component B; the stabilizer when exists is usually included in the component A and/or the component B; the water absorbing agent when exists is included in the component A and/or the component B; the curing accelerant when exists is included in the component A and/or the component B; the antioxidant when exists is usually included in the component A and/or the component B; the adhesion promoter when exists is included in the component A and/or the component B; and the solvent when exists is included in the component A and/or the component B.

The specific types of the other components are not particularly limited, for example, the defoaming agent, reactive diluent, reactive initiator, toughening agent, coupling agent, wetting and dispersing agent, accelerant, stabilizer, water absorbing agent, curing accelerant, antioxidant, adhesion promoter and the solvent can be selected by those skilled in the art according to the actual needs and common knowledge. The defoaming agent can be selected from siloxane defoaming agents. The reactive diluent can be selected from glycidyl ether reactive diluents; the toughening agent can be selected from polyurethane toughening agents. The coupling agent can be selected from one or more of γ-mercaptopropyltriethoxysilane, phenyl triethoxy silane, methyl triethoxy silane, bis(γ-mercaptopropyl triethoxysilyl propyl)-tetrasulfide and phenyl triethoxy silane. The wetting and dispersing agent can be selected from acrylic wetting and dispersing agents. The accelerant can be selected from one or more of modified imidazole, modified imidazole derivatives and modified amine compounds. The stabilizer can be selected from one or more of isopropyl isocyanate, phenyl isocyanate, n-butyl isocyanate and benzyl isocyanate.

The amount of the other components, for example, the defoaming agent, active diluent, active initiator, toughening agent, coupling agent, wetting and dispersing agent, accelerant, stabilizer, water absorbing agent, curing accelerant, antioxidant, adhesion promoter and the solvent, the amount of which can be adjusted by those skilled in the art based on common knowledge and the conventional properties of the required components, without particular limitation in the present disclosure.

The types and amounts of the above components all need to meet the viscosity and thermal conductivity of the potting adhesive. The viscosity of the potting adhesive needs to meet the application thereof in the on-board charger, and the thermal conductivity of the potting adhesive is greater than that of the conventional potting adhesive.

In an embodiment, the viscosity of the potting adhesive is measured to be in a range of 10900 mPa·S to 28000 mPa·s based on a standard ASTM D1084.

In an embodiment, the thermal conductivity of the potting adhesive is measured to be in a range of 2 W/mK to 5 W/mK based on the standard ISO22007-2.

In an embodiment of the present disclosure, a method for manufacturing a potting adhesive is provided, which includes the following steps:

S10: a first liquid organic adhesive, a second liquid organic adhesive, and ceramic particles in a ratio are provided;

S20: the ceramic particles are added into the first liquid organic adhesive and the second liquid organic adhesive respectively in proportions to uniformly mix to obtain a component A and a component B; and S30: other components are added into the component A and/or the component B respectively.

In an embodiment of the present disclosure, a heat dissipation device is provided, which includes an adhesive potting groove, a transformer placed in the adhesive potting groove, and a filling medium which fills and is consolidated in the gap between the transformer and the adhesive potting groove. The filling medium is the potting adhesive.

Referring to FIG. 1, the transformer includes a plurality of coils 10. In an embodiment, a thermally conductive ceramic sheet 20 is further provided between at least two coils 10 of the transformer to further enhance the heat dissipation effect.

Specific embodiments are provided as follows.

Embodiment I: Manufacture of Potting Adhesive

S10: 100 g of the first liquid organic adhesive, 100 g of the second liquid organic adhesive, and 20 g of aluminum oxide spherical ceramic particles with a particle size of 0.5 mm are provided.

The first liquid organic adhesive includes dimethylsiloxane with the mass proportion of 55%, silica with the mass proportion of 25% and a particle size of 25 μm, and aluminum oxide with the mass proportion of 20% and a particle size of 25 μm. The second liquid organic adhesive includes methyl hydrogen siloxane with the mass proportion of 35%, silicone oil with the mass proportion of 15%, aluminum hydroxide with the mass proportion of 25% and a particle size of 25 μm, and aluminum oxide with the mass proportion of 25% and a particle size of 25 μm.

S20: an automatic stirring device is utilized to uniformly disperse the 10 g of aluminum oxide spherical ceramic particles with the particle size of 0.5 mm in the 100 g of the first liquid organic adhesive, and uniformly disperse the other 10 g of aluminum oxide spherical ceramic particles with the particle size of 0.5 mm in the 100 g of the second liquid organic adhesive, to obtain the component A and the component B.

S30: at least one component of a defoaming agent, an active diluent, an active initiator, a toughening agent, a coupling agent, a wetting and dispersing agent, an accelerant, a stabilizer, a water absorbing agent, a curing accelerant, an antioxidant, an adhesion promoter and a solvent are continuously added into the component A and/or the component B.

Embodiment II: Manufacture of Potting Adhesive

The manufacture method is substantially the same as that in the Embodiment I, except that the mass of the aluminum oxide spherical ceramic particles with the particle size of 0.5 mm is 50 g, 25 g of ceramic particles are added into the first liquid organic adhesive, and 25 g of the ceramic particles are added into the second liquid organic adhesive.

Embodiment III: Manufacture of Potting Adhesive

The manufacture method is substantially the same as that in the Embodiment I, except that the mass of the alumina spherical ceramic particles with the particle size of 0.5 mm is 70 g, 35 g of ceramic particles are added into the first liquid organic adhesive, and 35 g of ceramic particles are added into the second liquid organic adhesive.

Embodiment IV: Manufacture of Potting Adhesive

The manufacture method is substantially the same as that in the Embodiment I, except that the mass of the aluminum oxide spherical ceramic particles with the particle size of 0.5 mm is 100 g, 50 g of ceramic particles are added into the first liquid organic adhesive, and 50 g of ceramic particles are added into the second liquid organic adhesive.

Embodiment V: Manufacture of Potting Adhesive

The manufacture method is substantially the same as that in the Embodiment I, except that the mass of the aluminum oxide spherical ceramic particles with the particle size of 0.5 mm is 120 g, 60 g of ceramic particles are added into the first liquid organic adhesive, and 60 g of ceramic particles are added into the second liquid organic adhesive.

Embodiment VI: Manufacture of Potting Adhesive

The manufacture method is substantially the same as that in the Embodiment I, except that the mass of the aluminum oxide spherical ceramic particles with the particle size of 0.5 mm is 150 g, 75 g of ceramic particles are added into the first liquid organic adhesive, and 75 g of ceramic particles are added into the second liquid organic adhesive.

Embodiment VII: Manufacture of Potting Adhesive

The manufacture method is substantially the same as that in the Embodiment I, except that the mass of the aluminum oxide spherical ceramic particles with the particle size of 0.5 mm is 170 g, 85 g of ceramic particles are added into the first liquid organic adhesive, and 85 g of ceramic particles are added into the second liquid organic adhesive.

Embodiment VIII: Manufacture of Potting Adhesive

The manufacture method is substantially the same as that in the Embodiment I, except that the mass of the aluminum oxide spherical ceramic particles with the particle size of 0.5 mm is 200 g, 100 g of ceramic particles are added into the first liquid organic adhesive, and 100 g of ceramic particles are added into the second liquid organic adhesive.

Comparative Example I

The manufacture method is substantially the same as that in the Embodiment I, except that the aluminum oxide spherical ceramic particles with the particle size of 0.5 mm are not added into both the first liquid organic adhesive and the second liquid organic adhesive.

Performance Test and Results

1. Viscosity Test

After the component A and the component B of the potting adhesive manufactured in the embodiments I to VIII are mixed, the viscosity thereof is tested based on the standard ASTM D1084, and the results are shown in Table 1.

TABLE 1

| Sample | Viscosity (mPa·s) |
| --- | --- |
| Embodiment I | 7591 |
| Embodiment II | 8512 |
| Embodiment III | 9350 |
| Embodiment IV | 10205 |
| Embodiment V | 11060 |
| Embodiment VI | 12615 |
| Embodiment VII | 15072 |
| Embodiment VIII | 17358 |
| Comparative example I | 7000 |

The thermal conductivity of the first liquid organic adhesive in the component A without the ceramic particles is measured to be in a range of 5500 to 6700 mPa·s based on the standard ASTM D1084; and the thermal conductivity of the first liquid organic adhesive in the component B without the ceramic particles is measured to be in a range of 7300 to 8900 mPa·s based on the standard ASTM D1084. It can be seen that the viscosity of the component A and/or component B with the ceramic particles is greater than that of the component A and/or component B without the ceramic particles; and the greater the mass of the ceramic particles added, the greater the viscosity of the potting adhesive. Thus, the mass of the ceramic particles added should be selected according to the actual situation. However, in general, the potting glue with ceramic particles has low viscosity and good fluidity.

2. Thermal Conductivity Test

The component A and the component B of the potting adhesive manufactured in the embodiments I to VIII are mixed to encapsulate the transformer in the on-board charger, and the thermal conductivity thereof is tested after heating and curing; and the results are shown in Table 2.

TABLE 2

| Sample | thermal conductivity (W/mK) |
| --- | --- |
| Embodiment I | 1.64 |
| Embodiment II | 1.84 |
| Embodiment III | 1.98 |
| Embodiment IV | 2.18 |
| Embodiment V | 2.31 |
| Embodiment VI | 2.50 |
| Embodiment VII | 2.63 |
| Embodiment VIII | 2.82 |
| Comparative example 1 | 1.50 |

The first liquid organic adhesive in the component A and the second liquid organic adhesive in the component B are mixed in a volume ratio or a mass ratio of 1:1. Without the ceramic particles, the thermal conductivity is measured to be in a range of 1.2 to 1.8 W/mK based on the standard ISO22007-2. It can be seen that by adding ceramic particles into the potting adhesive, the thermal conductivity of the potting adhesive can be greatly improved.

The potting adhesive is manufactured according to the embodiments I to VIII, and a heat dissipation device in embodiments of the present disclosure is manufactured according to the following steps.

The manufacture steps of the heat dissipation device are provided as follows.

Step 1: the corresponding component A (ceramic particles+first liquid organic adhesive) and component B (ceramic particles+second liquid organic adhesive) in the potting adhesive manufactured in the above embodiments I to VIII 8 are mixed to form a well-mixed slurry.

Step 2: an integrated transformer and an adhesive potting groove capable of receiving the integrated transformer are provided, the integrated transformer is placed in the adhesive potting groove, and then the well-mixed sample slurry in the step 1 is poured into the gap between the adhesive potting groove and the transformer.

Step 3: the sample in the step 2 is placed at a room temperature to cure for 30 minutes to form a corresponding heat dissipation device.

In the present disclosure, by adding ceramic particles with the particle size of 0.1 mm to 3 mm into the potting adhesive of the transformer, at least one or more of following advantages can be achieved: 1. compared to potting adhesive without ceramic particles of 0.1 mm to 3 mm, the thermal conductivity of the potting adhesive is improved, which is conducive to the heat dissipation of the magnetic components; 2. the volume of the heat dissipation component is reduced, and the volume of the magnetic component is reduced; 3. the cost of ceramic particles is lower than that of the ordinary potting adhesive, thereby reducing the cost of the potting adhesive; 4. the potting adhesive added with the ceramic particles having the particle size of 0.1 mm to 3 mm has better fluidity, which is beneficial for the potting adhesive to flow into the gap of the transformer during potting, to take away the heat inside the transformer; 5. the risk of dust pollution can be avoided by using the ceramic particles with the particle size of 0.1 mm to 3 mm.

The technical features of the above-mentioned embodiments can be combined arbitrarily. In order to make the description concise, all possible combinations of the various technical features in the above-mentioned embodiments are not described. However, as long as there is no contradiction in the combination of these technical features, all should be considered as the scope of the present disclosure.

The above-mentioned embodiments are merely some exemplary embodiments of the present disclosure, and the descriptions are relatively specific and detailed, but they should not be interpreted as limiting the scope of the disclosure. It should be pointed out that those of ordinary skill in the art can make several modifications and improvements without departing from the concept of the present disclosure, and these all fall within the protection scope of the present disclosure. Therefore, the scope of protection of the present disclosure shall be subject to the appended claims.

What is claimed is:

1. A potting adhesive, comprising: a component A and a component B, wherein the component A comprises a first liquid organic adhesive containing dimethyl siloxane, the component B comprises a second liquid organic adhesive containing methyl hydrogen siloxane and silicone oil, at least one of the component A and the component B further comprises ceramic particles which are spherical particles with a particle size of 0.5 mm to 2 mm;

wherein a mass ratio of the first liquid organic adhesive to the second liquid organic adhesive to the ceramic particles in the component A and/or the component B is equal to 1: (0.5 to 1.5): (0.1 to 2).

2. The potting adhesive according to claim 1, wherein the component A and the component B both comprise the ceramic particles, and a mass ratio of the ceramic particles in the component A to the ceramic particles in the component B is equal to (0.5 to 2):1.

3. The potting adhesive according to claim 1, wherein the ceramic particles comprise one or more of aluminum oxide, aluminum nitride, boron nitride, and silicon carbide.

4. The potting adhesive according to claim 1, wherein a viscosity of the potting adhesive is measured to be in a range of 7000 mPa·s to 28000 mPa·s based on a standard ASTM D1084.

5. The potting adhesive according to claim 1, wherein a thermal conductivity of the potting adhesive is measured to be in a range of 2 W/mK to 5 W/mK based on a standard ISO22007-2.

6. The potting adhesive according to claim 1, wherein the first liquid organic adhesive further comprises a first inorganic filler, and the first inorganic filler comprises micron-sized aluminum oxide or silicon dioxide or a mixture of micron-sized aluminum oxide and silicon oxide.

7. The potting adhesive according to claim 1, wherein the second liquid organic adhesive further comprises a second inorganic filler, and the second inorganic filler comprises micron-sized aluminum oxide or aluminum hydroxide or a mixture of micron-sized aluminum oxide and aluminum hydroxide.

8. The heat dissipation device potting adhesive according to claim 1, wherein the component A and the component B are fully mixed, or at least are in contact with each other and activated, so that the component A and the component B cure.

9. A heat dissipation device, comprising an adhesive potting groove, a transformer provided in the adhesive potting groove, and a filling medium which fills and is consolidated in a gap between the transformer and the adhesive potting groove, wherein the filling medium is the potting adhesive according to claim 1.

10. The heat dissipation device according to claim 9, wherein a thermally conductive ceramic sheet is provided between at least two coils of the transformer.

11. A potting adhesive according to claim 1, comprising: a component A and a component B, wherein the component A comprises a first liquid organic adhesive containing dimethyl siloxane, the component B comprises a second liquid organic adhesive containing methyl hydrogen siloxane and silicone oil, at least one of the component A and the component B further comprises ceramic particles which are spherical particles with a particle size of 0.5 mm to 2 mm;

wherein a mass ratio of the first liquid organic adhesive to the second liquid organic adhesive to the ceramic particles in the component A and/or the component B is equal to 1: (0.5 to 1): (1 to 2).

12. The potting adhesive according to claim 11, wherein the component A and the component B both comprise the ceramic particles, and a mass ratio of the ceramic particles in the component A to the ceramic particles in the component B is equal to (0.5 to 2):1.

13. The potting adhesive according to claim 11, wherein the ceramic particles comprise one or more of aluminum oxide, aluminum nitride, boron nitride, and silicon carbide.

14. The potting adhesive according to claim 11, wherein a viscosity of the potting adhesive is measured to be in a range of 7000 mPa·s to 28000 mPa·s based on a standard ASTM D1084.

15. The potting adhesive according to claim 11, wherein a thermal conductivity of the potting adhesive is measured to be in a range of 2 W/mK to 5 W/mK based on a standard ISO22007-2.

16. The potting adhesive according to claim 11, wherein the first liquid organic adhesive further comprises a first inorganic filler, and the first inorganic filler comprises micron-sized aluminum oxide or silicon dioxide or a mixture of micron-sized aluminum oxide and silicon oxide.

17. The potting adhesive according to claim 11, wherein the second liquid organic adhesive further comprises a second inorganic filler, and the second inorganic filler comprises micron-sized aluminum oxide or aluminum hydroxide or a mixture of micron-sized aluminum oxide and aluminum hydroxide.

18. The potting adhesive according to claim 11, wherein the component A and the component B are fully mixed, or at least are in contact with each other and activated, so that the component A and the component B cure.

\* \* \* \* \*